(12) United States Patent
Muramatsu

(10) Patent No.: US 8,553,509 B2
(45) Date of Patent: Oct. 8, 2013

(54) OPTICAL DISC APPARATUS

(75) Inventor: Keiichi Muramatsu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/461,964

(22) Filed: May 2, 2012

(65) Prior Publication Data

US 2012/0307614 A1   Dec. 6, 2012

(30) Foreign Application Priority Data

May 31, 2011   (JP) .................................. 2011-121816

(51) Int. Cl.
*G11B 7/00*   (2006.01)
(52) U.S. Cl.
USPC ..................... 369/47.41; 369/47.32
(58) Field of Classification Search
None
See application file for complete search history.

(56) References Cited

U.S. PATENT DOCUMENTS

| | | | |
|---|---|---|---|
| 5,446,879 A * | 8/1995 | Yamamoto et al. ................ 714/1 | |
| 5,617,535 A | 4/1997 | Aizawa et al. | |
| 6,351,412 B1 * | 2/2002 | Nozoe et al. ............. 365/185.09 | |
| 7,734,964 B2 * | 6/2010 | Nakata ........................ 714/710 | |
| 2002/0018405 A1 * | 2/2002 | Kumagami et al. ........ 369/30.17 | |
| 2005/0201177 A1 * | 9/2005 | Shiraishi et al. .............. 365/222 | |
| 2008/0270869 A1 * | 10/2008 | Hirabayashi ................. 714/764 | |
| 2009/0161507 A1 * | 6/2009 | Matsushita et al. .......... 369/47.5 | |
| 2010/0067343 A1 * | 3/2010 | Kaneko ...................... 369/53.44 | |
| 2011/0238933 A1 * | 9/2011 | Fujimoto ..................... 711/154 | |
| 2012/0254524 A1 * | 10/2012 | Fujimoto ..................... 711/103 |

FOREIGN PATENT DOCUMENTS

| | | | | |
|---|---|---|---|---|
| JP | 04156623 A | * | 5/1992 | ............. G06F 11/32 |
| JP | 5-250764 | | 9/1993 | |
| JP | 2005-063537 | | 3/2005 | |
| JP | 2006-344297 | | 12/2006 | |

OTHER PUBLICATIONS

Japanese Office Action dated Dec. 4, 2012 for corresponding Patent Application No. JP2011-121816.

\* cited by examiner

*Primary Examiner* — Peter Vincent Agustin
(74) *Attorney, Agent, or Firm* — Morgan, Lewis & Bockius LLP

(57) ABSTRACT

An optical disc apparatus comprising an optical disc drive for recording on and/or playing back an optical disc; a storage part for storing information; and a save control part for accumulating and saving error information in the storage part, the error information including information that indicates specific error contents in a case in which an error has been generated in the optical disc drive.

4 Claims, 4 Drawing Sheets

| NUMBER | DEFINITION NAME |
|---|---|
| ... | ...... |
| * * * | BCA MOVEMENT ERROR INFORMATION |
| ... | ...... |
| * * * | NO DISC ERROR INFORMATION |
| * * * | LD ABNORMALITY ERROR INFORMATION |
| * * * | FOCUSING ABNORMALITY ERROR INFORMATION |
| * * * | TRACKING ABNORMALITY ERROR INFORMATION |
| * * * | PFI ERROR INFORMATION |
| * * * | DISC DETERMINATION ERROR INFORMATION |
| * * * | TRAVERSE START POSITION ERROR INFORMATION |
| ... | ...... |
| * * * | DISC ECCENTRICITY ERROR INFORMATION |
| ... | ...... |
| * * * | DISC FLAW DETECTION ADJUSTMENT ERROR INFORMATION |
| * * * | FOCUSING ADJUSTMENT ERROR INFORMATION |
| * * * | OFFSET ADJUSTMENT ERROR INFORMATION |
| * * * | TRACKING ADJUSTMENT ERROR INFORMATION |
| ... | ...... |
| * * * | TEMPERATURE/FOCUSING BALANCE ADJUSTMENT ERROR INFORMATION |
| ... | ...... |
| * * * | DISC WEIGHT ABNORMALITY ERROR INFORMATION |
| * * * | TRACK MEANDERING ERROR INFORMATION |
| ... | ...... |
| * * * | READ SIGNAL ADJUSTMENT ERROR INFORMATION |
| ... | ...... |
| * * * | WRITE STRATEGY ABNORMALITY ERROR INFORMATION |
| ... | ...... |
| * * * | TASK OS ERROR INFORMATION |
| ... | ...... |
| * * * | FOCUSING SCRIPT ERROR INFORMATION |
| * * * | TRACKING SCRIPT ERROR INFORMATION |
| * * * | MOTOR SCRIPT ERROR INFORMATION |
| * * * | LD SCRIPT ERROR INFORMATION |
| ... | ...... |

FIG.3

| BYTE/BIT | 7 | 6 | 5 | 4 | 3 | 2 | 1 | 0 |
|---|---|---|---|---|---|---|---|---|
| 0 | VALID | ERROR CODE (70h or 71h) | | | | | | |
| 1 | RESERVED | | | | | | | |
| 2 | RESERVED | | | | SENSE KEY | | | |
| 3-6 | INFORMATION (LBA) | | | | | | | |
| 7 | ADDITIONAL SENSE LENGTH (0Ah) | | | | | | | |
| 8 | HOST ERROR INFORMATION | | | | | | | |
| 9 | READ/WRITE ERROR INFORMATION | | | | | | | |
| 10-11 | MECHA ERROR INFORMATION | | | | | | | |
| 12 | ADDITIONAL SENSE CODE (ASC) | | | | | | | |
| 13 | ADDITIONAL SENSE CODE QUALIFIER (ASCQ) | | | | | | | |
| 14 | RESERVED | | | | | | | |
| 15 | SKSV | RESERVED | | | | | | |
| 16 | (MSB) | PROGRESS INDICATION | | | | | | |
| 17 | | | | | | | | (LSB) |

FIG.4

| NUMBER | DEFINITION NAME |
|---|---|
| . . . | . . . . . |
| * * * | BCA MOVEMENT ERROR INFORMATION |
| . . . | . . . . . |
| * * * | NO DISC ERROR INFORMATION |
| * * * | LD ABNORMALITY ERROR INFORMATION |
| * * * | FOCUSING ABNORMALITY ERROR INFORMATION |
| * * * | TRACKING ABNORMALITY ERROR INFORMATION |
| * * * | PFI ERROR INFORMATION |
| * * * | DISC DETERMINATION ERROR INFORMATION |
| * * * | TRAVERSE START POSITION ERROR INFORMATION |
| . . . | . . . . . |
| * * * | DISC ECCENTRICITY ERROR INFORMATION |
| . . . | . . . . . |
| * * * | DISC FLAW DETECTION ADJUSTMENT ERROR INFORMATION |
| * * * | FOCUSING ADJUSTMENT ERROR INFORMATION |
| * * * | OFFSET ADJUSTMENT ERROR INFORMATION |
| * * * | TRACKING ADJUSTMENT ERROR INFORMATION |
| . . . | . . . . . |
| * * * | TEMPERATURE/FOCUSING BALANCE ADJUSTMENT ERROR INFORMATION |
| . . . | . . . . . |
| * * * | DISC WEIGHT ABNORMALITY ERROR INFORMATION |
| * * * | TRACK MEANDERING ERROR INFORMATION |
| . . . | . . . . . |
| * * * | READ SIGNAL ADJUSTMENT ERROR INFORMATION |
| . . . | . . . . . |
| * * * | WRITE STRATEGY ABNORMALITY ERROR INFORMATION |
| . . . | . . . . . |
| * * * | TASK OS ERROR INFORMATION |
| . . . | . . . . . |
| * * * | FOCUSING SCRIPT ERROR INFORMATION |
| * * * | TRACKING SCRIPT ERROR INFORMATION |
| * * * | MOTOR SCRIPT ERROR INFORMATION |
| * * * | LD SCRIPT ERROR INFORMATION |
| . . . | . . . . . |

OPTICAL DISC APPARATUS

This application is based on Japanese Patent Application No. 2011-121816 filed on May 31, 2011, the contents of which are hereby incorporated by reference.

BACKGROUND OF THE INVENTION

1. Field of the Invention

The present invention relates to an optical disc apparatus.

2. Description of Related Art

Up to now, various optical disc apparatuses compatible with Blu-ray Discs, DVDs, CDs, and other optical discs have appeared. It has been the case that when a malfunction occurs in an optical disc apparatus, the user of the optical disc apparatus requests repair service from the manufacturer, and the manufacturer having received the request identifies the reason for the malfunction of the optical disc apparatus in which a malfunction occurred.

In view of this, an optical disc apparatus is proposed in prior art, for example, Japanese Laid-open Patent Publication No. 2005-63537 in which the type of the disc having an error and the error information is saved in nonvolatile memory to reduce the burden at the time of repair in a case in which an error is generated during operation.

However, the error information in Japanese Laid-open Patent Publication No. 2005-63537 cannot be considered to be detailed information, and therefore a problem arises in which time is required to identify the cause of the malfunction.

SUMMARY OF THE INVENTION

An object of the present invention is to provide an optical disc apparatus in which the burden of engaging in repair service can be further reduced.

The present invention provides an optical disc apparatus comprising:

an optical disc drive for recording on and/or playing back an optical disc;

a storage part for storing information;

a save control part for accumulating and saving error information in the storage part, the error information including information for at least one of any of the following in accordance with a generated error in a case in which an error has been generated in the optical disc drive:

BCA Movement Error Information for indicating an error in a case in which movement is not possible when an attempt is made to move an optical pickup to a BCA (burst cutting area) provided on the optical disc;

No Disc Error Information for indicating an error in a case in which it was recognized that a disc is not present;

PFI Error Information for indicating an error in a case in which disc-type information recorded in a PFI (physical format information) region provided on the optical disc was read, and the disc-type information thus read expressed a disc type that is incompatible with the optical disc apparatus;

Disc Determination Error Information for indicating an error in a case in which the determined disc type is not the same as the disc-type information included in the disc information that was recorded on the optical disc;

Traverse Start Position Error Information for indicating an error produced when an attempt is made to move the optical pickup to a predetermined start position;

Disc Eccentricity Error Information for indicating an error in a case in which eccentricity of the optical disc has been detected;

Disc Flaw Detection Adjustment Error Information for indicating an error in a case in which there was a failure to adjust for detection of a flaw on the optical disc;

Focusing Adjustment Error Information for indicating an error in a case in which there was a failure to adjust the focus;

Offset Adjustment Error Information for indicating an error in a case in which there was a failure to adjust the offset;

Tracking Adjustment Error Information for indicating an error in a case in which there was a failure to adjust the tracking;

Temperature/Focusing Balance Adjustment Error Information for indicating an error in a case in which there was a failure to adjust the focusing balance that corresponds to the temperature surrounding the optical pickup;

Disc Weight Abnormality Error Information for indicating an error in a case in which an abnormality in the weight of the optical disc has been detected;

Track Meandering Error Information for indicating an error in a case in which it has been detected that a track on the optical disc is meandering;

Read Signal Adjustment Error Information for indicating an error in a case in which an abnormality related to the adjustment of an RF signal read by the optical pickup has been detected;

Write Strategy Abnormality Error Information for indicating an error in a case in which an abnormality relating to the write strategy implemented by an LD (laser diode) has been detected;

Task OS Error Information for indicating an error relating to an OS that manages the tasks of a front-end microcomputer;

Focusing Script Error Information for indicating a script error in a program that controls the focusing operation;

Tracking Script Error Information for indicating a script error in a program that controls the tracking operation;

Motor Script Error Information for indicating a script error in a program that controls a motor; and LD Script Error Information for indicating a script error in a program that controls the LD operation.

According to such a configuration, error information including detailed error contents is accumulated and saved in the storage part, thus allowing the cause of the malfunction to be readily identified when engaging in repair service and the burden of engaging in repair service to be reduced.

In the abovementioned configuration, the save control part may be a front-end microcomputer for communicating by ATAPI (AT Attachment Packet Interface) with a back-end microcomputer, and notice of error information may be provided from the front-end microcomputer to the back-end microcomputer in a case in which an error has been generated.

In any of the abovementioned configurations, the optical disc apparatus may be provided with a memory card storage control part for causing error information accumulated in the storage part to be stored on a memory card when a predetermined operation occurs in an operation part.

In any of the abovementioned configurations, the storage part may be nonvolatile memory provided in the optical disc drive.

BRIEF DESCRIPTION OF THE DRAWINGS

FIG. 3 is a view showing the configuration of error information according to an embodiment of the present invention; and FIG. 4 is a view showing an example of Mecha Error Information included in the error information according to an embodiment of the present invention.

DETAILED DESCRIPTION OF PREFERRED EMBODIMENTS

Overall Configuration

Figure 1:
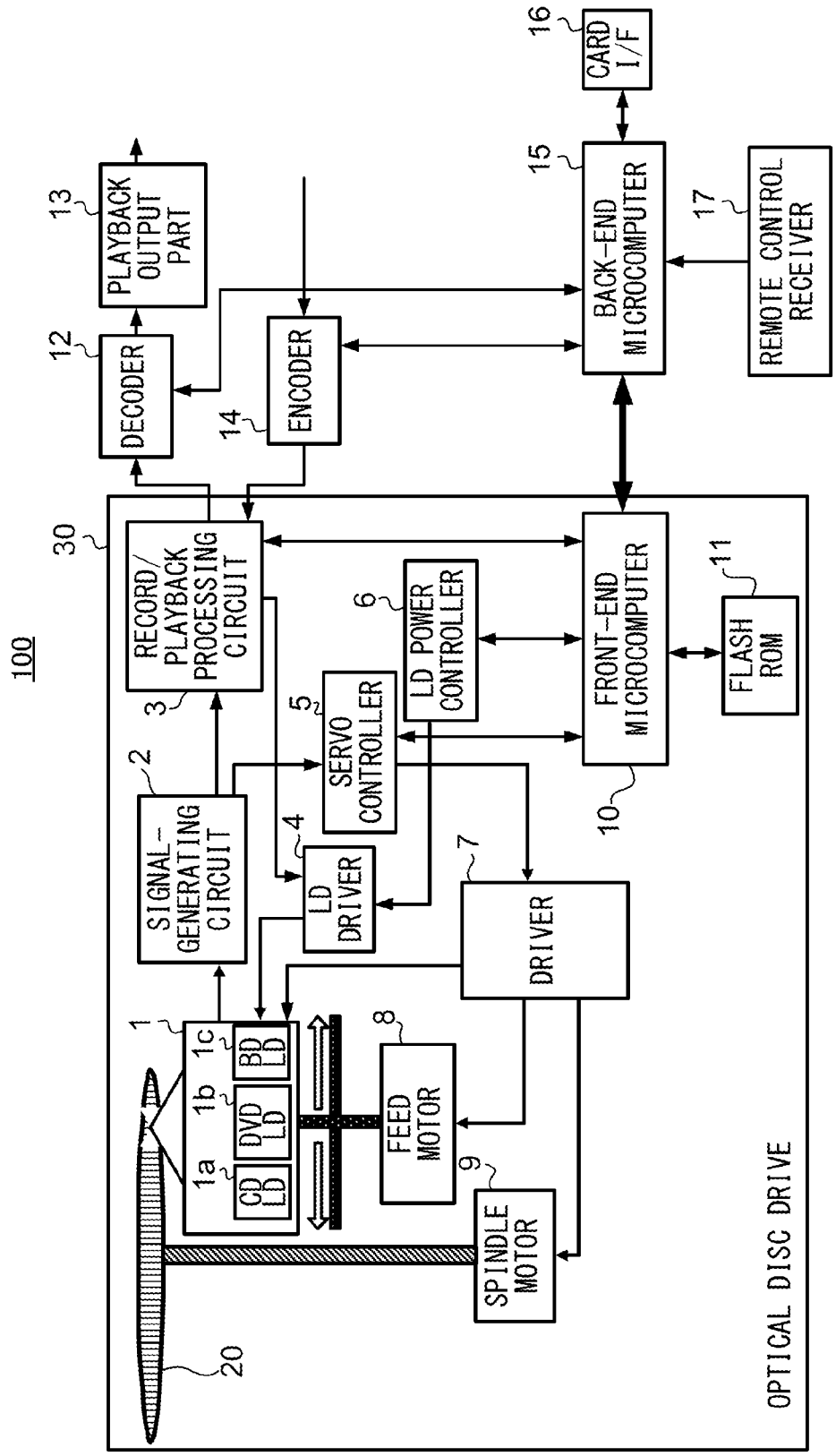
FIG. 1 is a schematic block diagram of an optical disc apparatus according to an embodiment of the present invention.

An embodiment of the present invention is described below with reference to the drawings. FIG. 1 shows a schematic configuration of an optical disc apparatus 100 according to an embodiment of the present invention. The optical disc apparatus 100 shown in FIG. 1 can record and playback a Blu-ray Disc (BD), DVD, and CD, and is provided with an optical disc drive 30 for reading and writing on an optical disc 20, a decoder 12 arranged on the back-end side, a playback output part 13, an encoder 14, a back-end microcomputer 15, a card interface 16, and a remote control receiver 17.

The optical disc drive 30 is provided with an optical pickup 1, a signal-generating circuit 2, a record/playback processing circuit 3, an LD driver 4, a servo controller 5, an LD power controller 6, a driver 7, a feed motor 8, a spindle motor 9, a front-end microcomputer 10, and a flash ROM 11. The optical pickup 1 has a CD LD (laser diode) 1a, a DVD LD 1b, and a BD LD 1c, which are light sources.

Figure 2:
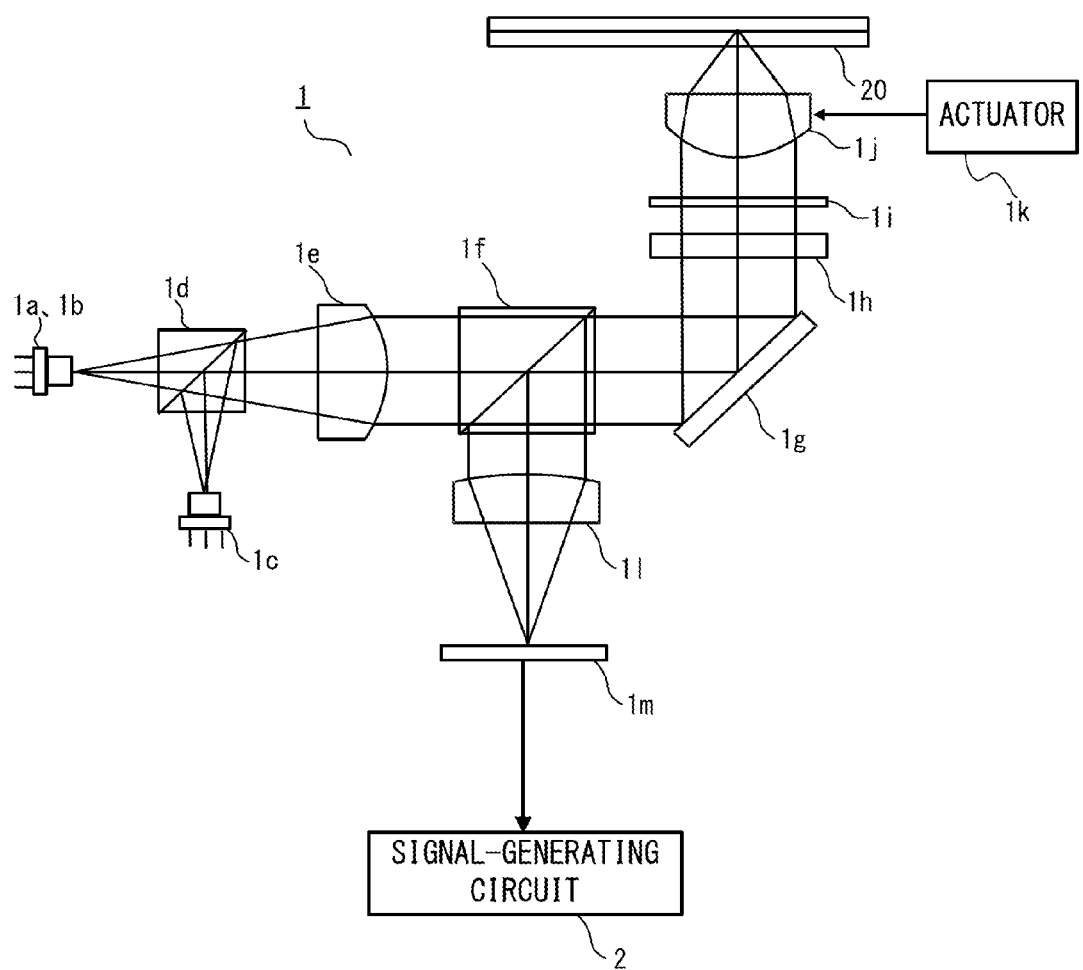
FIG. 2 is a schematic view showing an optical system of an optical pickup according to an embodiment of the present invention.

FIG. 2 shows a schematic view showing the optical system of the optical pickup 1. The optical pickup 1 irradiates a light beam onto the optical disc 20 and receives the reflected light. The optical pickup 1 thereby reads information recorded on the recording layer of the optical disc 20, writes data on the recording layer of the optical disc 20, and performs other functions.

The optical pickup 1 is provided with a CD LD 1a, a DVD LD 1b, a BD LD 1c, a dichroic prism 1d, a collimating lens 1e, a beam splitter 1f, a rising mirror 1g, a liquid crystal element 1h, a ¼ wave plate 1i, an object lens 1j, an actuator 1k, a detection lens 1l, and a photodetector 1m.

The CD LD 1a and the DVD LD 1b are configured as a two-wavelength integrated LD having two light-emitting points capable of radiating a 780-nm light beam compatible with a CD and a 650-nm light beam compatible with a DVD. The BD LD 1c is an LD capable of radiating a 405-nm light beam compatible with a BD.

The CD LD 1a and the DVD LD 1b may separately use, for example, an LD that radiates only a light beam having a single wavelength.

The dichroic prism 1d transmits light beams radiated from the CD LD 1a and the DVD LD 1b and reflects the light beams radiated from the BD LD 1c. The optical axes of the light beams radiated from the CD LD1a, the DVD LD 1b, and the BD LD 1c are made to be the same. The light beams transmitted or reflected by the dichroic prism 1d are sent to the collimating lens 1e.

The collimating lens 1e converts the light beams radiated from the dichroic prism 1d into parallel light. The light beams that were made into parallel light by the collimating lens 1e are sent to the beam splitter 1f.

The beam splitter 1f functions as a light-separating element for separating the incident light beams, transmits and directs the light beams sent from the collimating lens 1e to the optical disk 20 side, reflects the light beams reflected by the optical disc 20, and guides the reflected light toward the photodetector 1m side. The light beams transmitted through the beam splitter 1f are sent to the rising mirror 1g.

The rising mirror 1g reflects the light beams transmitted through the beam splitter 1f and guides the light beams toward the optical disc 20. The rising mirror 1g is in a state tilted 45° with respect to the optical axis of the light beams from the beam splitter 1f, and the optical axis of the light beams reflected by the rising mirror 1g is substantially orthogonal to the recording surface of the optical disc 20. The light beams reflected by the rising mirror 1g are sent to the liquid crystal element 1h.

The liquid crystal element 1h is an element that applies voltage to liquid crystals held between transparent electrodes (not shown in any of the drawings), thereby making it possible to control changes in the refractive index and to control phases of the light beams transmitted through the liquid crystal element 1h by employing properties in which liquid crystal molecules change orientation direction.

Spherical aberrations produced by differences in the thickness of the resin layer protecting the recording surface of the optical disc 20 or the like can be corrected by arranging the liquid crystal element 1h. The light beams passing through the liquid crystal element 1h are sent to the ¼ wave plate 1i.

The ¼ wave plate 1i has a function for converting linearly polarized incident light to circularly polarized light, and for converting circularly polarized incident light to linearly polarized light. Laser light sent from the liquid crystal element 1h and passed through the ¼ wave plate 1i is converted from linearly polarized light to circularly polarized light and sent to the object lens 1j.

The object lens 1j concentrates the light beams transmitted through the ¼ wave plate 1i on the recording surface of the optical disc 20. In addition, the object lens 1j can be moved in, for example, the up and down direction (vertical direction relative to the recording surface of the optical disc 20) and the left and right direction (radial direction of the optical disc 20) of FIG. 2 using the later-described actuator 1k. This position is controlled on the basis of the focus servo signal and the tracking servo signal.

The light reflected by the optical disc 20 passes, in sequence, through the object lens 1j, the ¼ wave plate 1i, and the liquid crystal element 1h. The light is then reflected by the rising mirror 1g, further reflected by the beam splitter 1f, and concentrated on a light-receiving element provided on the photodetector 1m by the detection lens 1l.

The photodetector 1m converts light received using a photo diode or other light-receiving element to an electrical signal, and outputs the signal to the signal-generating circuit 2. The photodetector 1m is provided with a light-receiving region for receiving light beams divided into, for example, four parts, and is able to perform photoelectric conversion separately in each region and output the electrical signals.

The actuator 1k moves the object lens 1j in the radial direction of the optical disc 20 in accordance with the object lens drive signal generated and outputted by the drive 7 (FIG. 1). For example, the actuator 1k can be one that allows drive current to flow through a coil (not shown) positioned in a magnetic field that is formed by a permanent magnet (not shown), and drives the object lens 1j using Lorentz force.

In addition, the actuator 1k can perform a tracking operation for moving the object lens 1j in a direction along the recording surface of the optical lens 20, and can perform a focusing operation for moving the object lens 1j so as to approach and move away from the optical disc 20.

Returning the description to FIG. 1, the signal-generating circuit 2 generates an RF signal, a tracking error signal, a focusing error signal, a focusing sum signal, and various other signals on the basis of the electrical signals photoelectrically converted and outputted from the photodetector 1*m* (FIG. 2).

The servo controller 5 generates a tracking servo signal on the basis of the tracking error signal and outputs the signal to the driver 7. The driver 7 drives the actuator 1*k* (FIG. 2) inside the optical pickup 1 on the basis of the tracking servo signal. The actuator 1*k* thereby drives and controls the object lens 1*j* in the radial direction of the optical disc 20, and performs tracking control for causing the object lens 1*j* to follow a track.

In addition, the servo controller 5 generates a focusing servo signal on the basis of the focusing error signal and outputs the signal to the driver 7. The driver 7 drives the actuator 1*k* inside of the optical pickup 1 on the basis of the focusing servo signal. The actuator 1*k* thereby drives and controls the object lens 1*j* in the direction perpendicular to the recording surface of the optical disc 20, and performs focusing control for causing the focal position of the object lens to follow the recording layer.

The LD power controller 6 controls the LD driver 4 so as to drive the CD LD 1*a*, DVD LD 1*b*, and BD LD 1*c* using the desired output power.

During playback of the optical disc 20, the CD LD 1*a*, DVD LD 1*b*, and BD LD 1*c* are driven by the control of the LD power controller 6 using the desired playback power. At this time, the record/playback processing circuit 3 performs binarization, demodulation processing, and error correction on the RF signal inputted from the signal-generating circuit 2 to extract playback data. The decoder 12 decodes the playback data and outputs the decoded audio and video data to an external part of the apparatus via the playback output part 13.

During recording on the optical disc 20, the record/playback processing circuit 3 adds flags for error correction and performs modulation processing on the recorded data after the data is encoded by the encoder 14. The processed data is then sent to the LD driver 4. The LD driver 4 drives the CD LD 1*a*, DVD LD 1*b*, and BD LD 1*c* on the basis of the data sent from the record/playback processing circuit 3, and causes the data to be recorded on the optical disc 20. At this time, the CD LD 1*a*, DVD LD 1*b*, and BD LD 1*c* are driven by the control of the LD power controller 6 using the desired recording power.

The feed motor 8 drives the optical pickup 1 in the radial direction of the optical disc 20 using the drive signal from the driver 7. The spindle motor 9 drives the optical disc 20 in the rotating direction using the drive signal from the driver 7.

The front-end microcomputer 10 controls the servo controller 5, the LD power controller 6, and every other part of the optical disc drive 30. The flash ROM 11 is nonvolatile memory for holding stored information even when the power source is cut, and error information is accumulated and saved in the flash ROM 11 by the front-end microcomputer 10. Error information will be described in detail later.

The back-end microcomputer 15 controls every part on the back-end side, and the front-end microcomputer 10 and the back-end microcomputer 15 can communicate using an ATAPI (AT Attachment Packet Interface). The back-end microcomputer 15 sends various commands to the front-end microcomputer 10, and the front-end microcomputer 10 can provide notice of error information and the like to the back-end microcomputer 15.

For example, an SD card or other memory card (not shown) can be attached to and detached from the card interface 16, which writes error information and the like to the memory card. The remote control receiver 17 receives infrared signals that correspond to operations from a remote control device (not shown), and outputs the remote control code to the back-end microcomputer 15.

Error Information

In a case in which an error is generated in the optical disc drive 30, the front-end microcomputer 10 gives notice of the error information to the back-end microcomputer 15 and saves the error information in the flash ROM 11. FIG. 3 shows a configuration example of error information. The error information shown in FIG. 3 conforms to the ATAPI, and has a total of 18 bytes of information from byte 0 to byte 17.

An error code is 0 to 6 bits of byte 0. The error code is 70h when the error occurs in a current command from the back-end microcomputer 15, and is 71h when the error occurs in a past command from the back-end microcomputer 15.

A Sense Key is 0 to 3 bits of byte 2, and an ASC (Additional Sense Code) of byte 12, and an ASCQ (Additional Sense Code Qualifier) of byte 13 are combined together to indicate a variety of errors (for example, a focusing servo error, tracking servo error, and the like). The back-end microcomputer 15 performs a process corresponding to an error using the Sense Key, the ASC, and the ASCQ.

The information of bytes 8 to 11 is vendor information that can be freely prescribed by the maker, and the back-end microcomputer 15 does not refer to this information. Host Error Information of byte 8 indicates a communication error with the back-end microcomputer 15 in the software referred to as the host, which is the software in the front-end microcomputer 10 that is closest to the back-end microcomputer 15. Read/Write Error Information of byte 9 indicates an error during reading or writing on the optical disc 20.

Mecha Error Information, which is two-byte data composed of bytes 10 and 11, indicates an error relating to the hardware in the optical disc drive 30. Particularly important information in the Mecha Error Information is extracted and described in FIG. 4. The information is contained in bytes 10 and 11 as data in which the "number" in FIG. 4 is indicated by the two bytes. The content of each of the errors shown in FIG. 4 is described below.

"BCA Movement Error Information" indicates an error in a case in which movement is not possible when an attempt is made to move the optical pickup 1 to a BCA (burst cutting area) provided on the optical disc 20.

"No Disc Error Information" indicates an error in a case in which it has been recognized that a disc is not present, for example, it has been detected that the optical disc itself is not mounted, it has been detected that the optical disc is mounted upside-down, or other such cases. A plurality of numbers is assigned in accordance with the plurality of error contents.

"LD Abnormality Error Information" indicates an error in a case in which an abnormality relating to a laser diode (LD) was detected, and a plurality of numbers is assigned in accordance with the plurality of error contents. "Focusing Abnormality Error Information" indicates an error in a case in which an abnormality relating to the focusing operation was detected, and a plurality of numbers is assigned in accordance with the plurality of error contents. "Tracking Abnormality Error Information" indicates an error in a case in which an abnormality relating to the tracking operation was detected.

"PFI Error Information" indicates an error in a case in which disc-type information recorded in a PFI (physical format information) region provided on the optical disc 20 was read, and the disc-type information thus read expressed a disc type that is incompatible with the optical disc apparatus 100. A plurality of numbers is assigned in accordance with the plurality of error contents.

"Disc Determination Error Information" indicates an error in a case in which the disc type determined on the basis of the focusing error signal and the focusing sum signal is not the same as the disc-type information included in the disc information that was recorded on the optical disc 20. A plurality of numbers is assigned in accordance with the plurality of error contents.

"Traverse Start Position Error Information" indicates an error produced when an attempt is made to move the optical pickup 1 to a predetermined start position, and a plurality of numbers is assigned in accordance with the plurality of error contents.

"Disc Eccentricity Error Information" indicates an error in a case in which eccentricity of the optical disc 20 has been detected.

"Disc Flaw Detection Adjustment Error Information" indicates an error in a case in which there was a failure to adjust for the detection of a flaw on the optical disc 20. "Focusing Adjustment Error Information" indicates an error in a case in which there was a failure to adjust the focus. "Offset Adjustment Error Information" indicates an error in a case in which there was a failure to adjust the offset. "Tracking Adjustment Error Information" indicates an error in a case in which there was a failure to adjust the tracking.

"Temperature/Focusing Balance Adjustment Error Information" indicates an error in a case in which there was a failure to adjust the focusing balance that corresponds to the temperature surrounding the optical pickup 1.

"Disc Weight Abnormality Error Information" indicates an error in a case in which an abnormality in the weight of the optical disc 20 has been detected. "Track Meandering Error Information" indicates an error in a case in which it has been detected that a track on the optical disc 20 is meandering.

"Read Signal Adjustment Error Information" indicates an error in a case in which an abnormality related to the adjustment of the RF signal read by the optical pickup 1 has been detected.

"Write Strategy Abnormality Error Information" indicates an error in a case in which an abnormality relating to the write strategy implemented by the LD has been detected.

"Task OS Error Information" indicates an error relating to the OS that manages the tasks of the front-end microcomputer 10.

"Focusing Script Error Information" indicates a script error in the program that controls the focusing operation. "Tracking Script Error Information" indicates a script error in the program that controls the tracking operation. "Motor Script Error Information" indicates a script error in the program that controls the spindle motor 9. "LD Script Error Information" indicates a script error in the program that controls the LD operation. It is also possible to provide error information indicating a script error in the program that controls, for example, the feed motor 8, the drive motor (not shown) of the disc tray, or other motors without limitation to the spindle motor 9. In addition, a plurality of numbers is assigned in accordance with the plurality of error contents for each instance of script error information.

In a case in which an error has been generated, notice of error information (FIG. 3) in which the Mecha Error Information of the corresponding error content is contained is provided to the back-end microcomputer 15 by the front-end microcomputer 10, and the error information is accumulated and saved in the flash ROM 11 by the front-end microcomputer 10.

When a predetermined operation (usually an operation unknown to the end user) is performed in the remote control device (not shown), the back-end microcomputer 15 acquires error information accumulated in the flash ROM 11 in accordance with the requirements of the front-end microcomputer 10 and stores the error information in the memory card via the card interface 16. Error information including detailed error contents can thereby be acquired from the memory card by the manufacturer who received a repair request from an end user after a malfunction occurred in the optical disc apparatus 100, and the cause of the malfunction can be readily identified. Accordingly, the burden of engaging in repair service can be reduced.

An embodiment of the present invention was described above, but the embodiment may be subject to various modifications within the scope of the present invention.

What is claimed is:

1. An optical disc apparatus comprising:
   an optical disc drive for recording on and/or playing back an optical disc;
   a storage part for storing information;
   a save control part for accumulating and saving error information in the storage part, in a case in which an error has been generated in the optical disc drive, the error information including information for at least one of any of the following in accordance with a generated error:
   BCA Movement Error Information for indicating an error in a case in which movement is not possible when an attempt is made to move an optical pickup to a BCA (burst cutting area) provided on the optical disc;
   No Disc Error Information for indicating an error in a case in which it was recognized that a disc is not present;
   PFI Error Information for indicating an error in a case in which disc-type information recorded in a PFI (physical format information) region provided on the optical disc was read, and the disc-type information thus read expressed a disc type that is incompatible with the optical disc apparatus;
   Disc Determination Error Information for indicating an error in a case in which the determined disc type is not the same as the disc-type information included in the disc information that was recorded on the optical disc;
   Traverse Start Position Error Information for indicating an error produced when an attempt is made to move the optical pickup to a predetermined start position;
   Disc Eccentricity Error Information for indicating an error in a case in which eccentricity of the optical disc has been detected;
   Disc Flaw Detection Adjustment Error Information for indicating an error in a case in which there was a failure to adjust for detection of a flaw on the optical disc;
   Offset Adjustment Error Information for indicating an error in a case in which there was a failure to adjust the offset;
   Temperature/Focusing Balance Adjustment Error Information for indicating an error in a case in which there was a failure to adjust the focusing balance that corresponds to the temperature surrounding the optical pickup;
   Disc Weight Abnormality Error Information for indicating an error in a case in which an abnormality in the weight of the optical disc has been detected;
   Track Meandering Error Information for indicating an error in a case in which it has been detected that a track on the optical disc is meandering;
   Read Signal Adjustment Error Information for indicating an error in a case in which an abnormality related to the adjustment of an RF signal read by the optical pickup has been detected;

Write Strategy Abnormality Error Information for indicating an error in a case in which an abnormality relating to the write strategy implemented by an LD (laser diode) has been detected;

Task OS Error Information for indicating an error relating to an OS that manages the tasks of a front-end microcomputer;

Focusing Script Error Information for indicating a script error in a program that controls the focusing operation;

Tracking Script Error Information for indicating a script error in a program that controls the tracking operation;

Motor Script Error Information for indicating a script error in a program that controls a motor;

LD Script Error Information for indicating a script error in a program that controls the LD operation, and comprising a storage control part for causing error information accumulated in the storage part to be stored on a removable medium when a predetermined operation occurs in an operation part.

2. The optical disc apparatus of claim 1, wherein the save control part is a front-end microcomputer for communicating by ATAPI (AT Attachment Packet Interface) with a back-end microcomputer, and notice of error information is provided from the front-end microcomputer to the back-end microcomputer in a case in which an error has been generated.

3. The optical disc apparatus of claim 1, wherein the storage part is nonvolatile memory provided in the optical disc drive.

4. The optical disc apparatus of claim 2, wherein the storage part is nonvolatile memory provided in the optical disc drive.

* * * * *